US012683766B2

(12) United States Patent
Liu

(10) Patent No.: US 12,683,766 B2
(45) Date of Patent: Jul. 14, 2026

(54) LICENSE CONTROL USING A MEMORY DEVICE HAVING A CRYPTOGRAPHIC KEY

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 186 days.

(21) Appl. No.: 17/668,747

(22) Filed: Feb. 10, 2022

(65) Prior Publication Data

US 2023/0254124 A1 Aug. 10, 2023

(51) Int. Cl.
| | |
|---|---|
| *H04L 9/08* | (2006.01) |
| *H04L 9/30* | (2006.01) |
| *H04L 9/32* | (2006.01) |

(52) U.S. Cl.
CPC .......... *H04L 9/0825* (2013.01); *H04L 9/0841* (2013.01); *H04L 9/3066* (2013.01); *H04L 9/3247* (2013.01); *H04L 9/3278* (2013.01)

(58) Field of Classification Search
CPC ... H04L 9/0825; H04L 9/0841; H04L 9/3066; H04L 9/3247; H04L 9/3278; H04L 9/0866; G06F 21/78; G06F 21/602; G06F 21/64
See application file for complete search history.

(56) References Cited

U.S. PATENT DOCUMENTS

| | | | | |
|---|---|---|---|---|
| 10,296,752 | B2* | 5/2019 | Nix | H04W 12/42 |
| 2009/0249064 | A1* | 10/2009 | De Atley | G06F 21/51 |
| | | | | 713/176 |
| 2010/0275029 | A1* | 10/2010 | Little | G06F 21/64 |
| | | | | 713/176 |
| 2018/0025151 | A1* | 1/2018 | Ekberg | H04L 9/3271 |
| | | | | 713/176 |
| 2018/0198625 | A1* | 7/2018 | Tseng | H04L 63/0428 |
| 2018/0254889 | A1* | 9/2018 | Fiege | H04L 9/3271 |
| 2020/0044844 | A1* | 2/2020 | Sridhara | H04W 12/03 |
| 2021/0192017 | A1* | 6/2021 | Aigner | G06F 21/554 |
| 2022/0131857 | A1* | 4/2022 | Nolte | H04L 63/0823 |
| 2023/0128131 | A1* | 4/2023 | Peddada | H04L 9/14 |
| | | | | 713/171 |

* cited by examiner

*Primary Examiner* — Mohammad W Reza
(74) *Attorney, Agent, or Firm* — Greenberg Traurig

(57) ABSTRACT

In some aspects, the techniques described herein relate to a system including a memory device secure storage region, the secure storage region storing a first cryptographic key and a digital certificate associated with the first cryptographic key; and a computing device, the computing device communicatively coupled to the memory device and configured to: generate a challenge value; transmit the challenge value to the memory device; receive a digital signature from the memory device; validate the digital signature using a second cryptographic key; and continue processing after validating the digital signature.

19 Claims, 5 Drawing Sheets

400

LICENSE CONTROL USING A MEMORY DEVICE HAVING A CRYPTOGRAPHIC KEY

FIELD OF THE TECHNOLOGY

At least some embodiments disclosed herein relate generally to semiconductor devices and, in particular, to managing the identity of secure semiconductor devices.

BACKGROUND

Many software and firmware images require licenses to be acquired prior to launching or processing. Some current systems often rely on the manual entry (i.e., typing) of license codes, which can be compromised. Other current systems rely on network-based authentication (e.g., using a license server), which requires network access, rendering software inaccessible in an offline environment, and also requires a long-term investment in server infrastructure.

DETAILED DESCRIPTION

Figure 1:
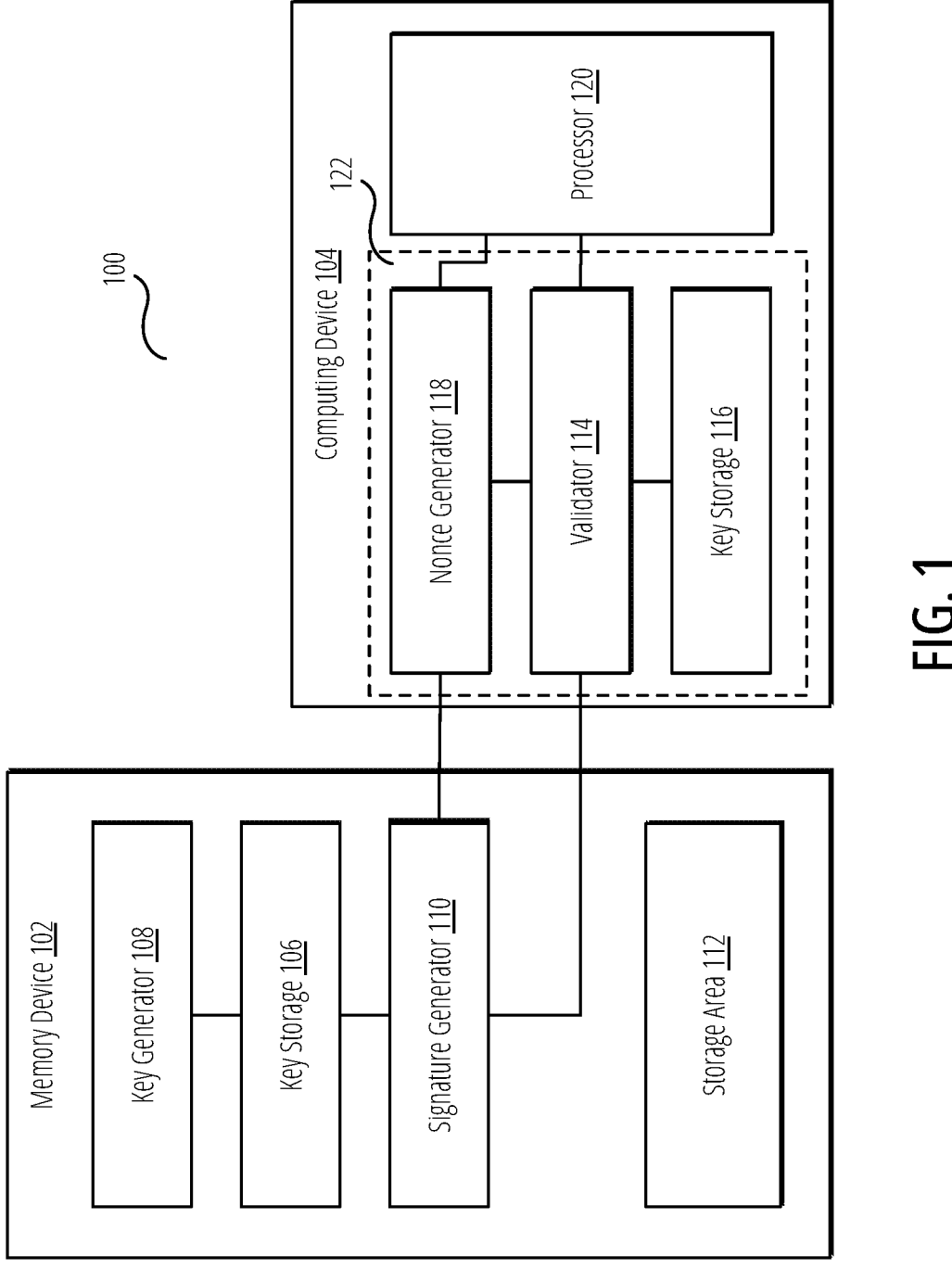
FIG. 1 is a block diagram illustrating a system for utilizing a personal identity device as a license control according to some of the example embodiments.

An electronic device includes cryptographic keys used for self-identification (i.e., device identification). For example, an electronic device can include and/or generate an asymmetric key pair used to uniquely identify the device. Further, an electronic device can include digital certificates that include a cryptographic key and are signed by a trusted certificate authority (CA). During the process of issuing the digital certificate, a user can attest as to their identity and the user's identity can be included in the digital certificate along with the public key. As such, electronic devices with cryptographic keys and digital certificates can be used as personal identity devices.

The example embodiments provide a solution wherein a memory device acts as a license control for a computing device. In an embodiment, the memory device stores a cryptographic key. In some embodiments, this cryptographic key comprises an asymmetric key pair, such as an Elliptic Curve Cryptography (ECC), Elliptic Curve Digital Signature Algorithm (ECDSA), or Elliptic-curve Diffie-Hellman (ECDH) key pair, that includes a device public key and a device private key. In an embodiment, a physically unclonable function (PUF) can be used to generate the cryptographic key, thus ensuring its uniqueness to the memory device. In another embodiment, a Device Identity Composition Engine (DICE) can be used to generate the cryptographic key. In a DICE embodiment, the cryptographic key can comprise a Layer 0 device key. In an embodiment, the memory device also includes a digital certificate associated with the cryptographic key. In some embodiments, the digital certificate is signed by a manufacturer of the memory device. In some embodiments, the digital certificate includes the cryptographic key. In some embodiments, the digital certificate can be securely regenerated by the manufacturer if the cryptographic key changes.

In some embodiments, the memory device can be communicatively coupled to a computing device (e.g., host processor, host computer, etc.). In some embodiments, the memory device can be a removable storage device (e.g., "dongle") that can be attached and unattached from the computing device. In an embodiment, the computing device can provide general purposes functionality in addition to the functions described herein. In an embodiment, the computing device includes firmware or software executed by a processor. In an embodiment, the firmware or software can store a copy of the cryptographic key stored by the memory device. For example, if the cryptographic key is an asymmetric key, the firmware or software can store the public key of the memory device. In some embodiments, the firmware or software can obtain the public key from the memory device. In other embodiments, the public key can be retrieved from a remote source. In other embodiments, the public key can be pre-written to a storage area accessible by the firmware or software. In some embodiments, the public key can be written to a secure area (e.g., write-protected region) of the computing device and only changed via a secure command. Thus, in some embodiments, the computing device is equipped with a cryptographic key that should match an expected memory device or user (as described next).

In an embodiment, when the firmware or software is executed (e.g., on startup or boot), the firmware or software can generate a challenge before continuing to process or launch. In an embodiment, the challenge can comprise a nonce value (e.g., a pseudo-random value, monotonic counter, etc.). In other embodiments, the challenge can comprise a function (e.g., mathematical expression). In an embodiment, the firmware or software can send the challenge to the memory device after generating the challenge. In some embodiments, the memory device can expose a command to allow the firmware or software to send the challenge. In other embodiments, the challenge can be included as a payload of an existing command.

The memory device receives the challenge from the firmware or software and returns a signature. In an embodiment, if the challenge is a nonce, the memory device can sign the nonce using its cryptographic key (e.g., a private key corresponding to the public key stored by the firmware or software). In an embodiment, if the challenge is a function, the memory device can execute the function (e.g., compute the mathematical result), sign the result of executing the function, and return the signed result.

When the firmware or software receives the response, the firmware or software can verify the signature using its stored cryptographic key. For example, the firmware or software can use a public key corresponding to the memory device's signing key to validate the signature. If the validation passes, the firmware or software can confirm that the proper user is using the device. If not, the firmware or software can halt execution.

In some aspects, the techniques described herein relate to a system including: a memory device secure storage region, the secure storage region storing a first cryptographic key; and a computing device, the computing device communicatively coupled to the memory device and configured to: generate a challenge value; transmit the challenge value to the memory device; receive a digital signature from the memory device; validate the digital signature using a second cryptographic key; and continue processing after validating the digital signature.

In some aspects, the techniques described herein relate to a system, wherein the first cryptographic key comprises a private key of an asymmetric key pair and the second cryptographic key comprises a public key of the asymmetric key pair.

In some aspects, the techniques described herein relate to a system, wherein the asymmetric key pair includes one of an Elliptic Curve Digital Signature Algorithm or Elliptic-curve Diffie-Hellman key pair.

In some aspects, the techniques described herein relate to a system, wherein the device further includes a physically unclonable function (PUF), and the device is configured to generate the asymmetric key using the PUF.

In some aspects, the techniques described herein relate to a system, wherein the device further includes a Device Identity Composition Engine (DICE), and the device is configured to generate the asymmetric key using the DICE.

In some aspects, the techniques described herein relate to a system, wherein the computing device is further configured to halt processing upon determining that the digital signature is invalid.

In some aspects, the techniques described herein relate to a system, wherein the computing device receiving the second cryptographic key embedded in or included with software to execute on the computing device.

In some aspects, the techniques described herein relate to a system, wherein the challenge includes one of a nonce value or function.

In some aspects, the techniques described herein relate to a system, wherein the memory device is further configured to sign the challenge value using the first cryptographic key.

In some aspects, the techniques described herein relate to a method including: generating, by a computing device, a challenge value; transmitting, by the computing device, the challenge value to a memory device, the memory device storing a private key; receiving, by the computing device, a digital signature from the memory device, the digital signature device computing using the private key; validating, by the computing device, the digital signature using a public key corresponding to the private key; and continuing, by the computing device, processing after validating the digital signature.

In some aspects, the techniques described herein relate to a method, further including halting processing upon determining that the digital signature is invalid.

In some aspects, the techniques described herein relate to a method, further including receiving the second cryptographic key embedded in or included with software to execute on the computing device.

In some aspects, the techniques described herein relate to a method, wherein generating a challenge value includes generating a nonce value.

In some aspects, the techniques described herein relate to a method, wherein generating a challenge value includes generating a function.

In some aspects, the techniques described herein relate to a method, further including reading the public key from a digital certificate issued by a manufacturer of the memory device.

In some aspects, the techniques described herein relate to a non-transitory computer-readable storage medium for tangibly storing computer program instructions capable of being executed by a computer processor, the computer program instructions defining steps of: generating, by the computer processor, a challenge value; transmitting, by the computer processor, the challenge value to a memory device, the memory device storing a private key; receiving, by the computer processor, a digital signature from the memory device, the digital signature device computing using the private key; validating, by the computer processor, the digital signature using a public key corresponding to the private key; and continuing, by the computer processor, processing after validating the digital signature.

In some aspects, the techniques described herein relate to a non-transitory computer-readable storage medium, the steps further including halting processing upon determining that the digital signature is invalid.

In some aspects, the techniques described herein relate to a non-transitory computer-readable storage medium, the steps further including receiving the second cryptographic key embedded in or included with software to execute on the computing device.

In some aspects, the techniques described herein relate to a non-transitory computer-readable storage medium, wherein generating a challenge value includes generating one of a nonce value and a function.

In some aspects, the techniques described herein relate to a non-transitory computer-readable storage medium, the steps further including reading the public key from a digital certificate issued by a manufacturer of the memory device.

FIG. 1 is a block diagram illustrating a system for utilizing a personal identity device as a license control according to some of the example embodiments.

In an embodiment, system 100 includes a memory device 102 and a computing device 104. Some details of memory device 102 are described in FIG. 4 and are not repeated herein. Some details of computing device 104 are described in FIG. 5 and are not repeated herein.

Figure 4:
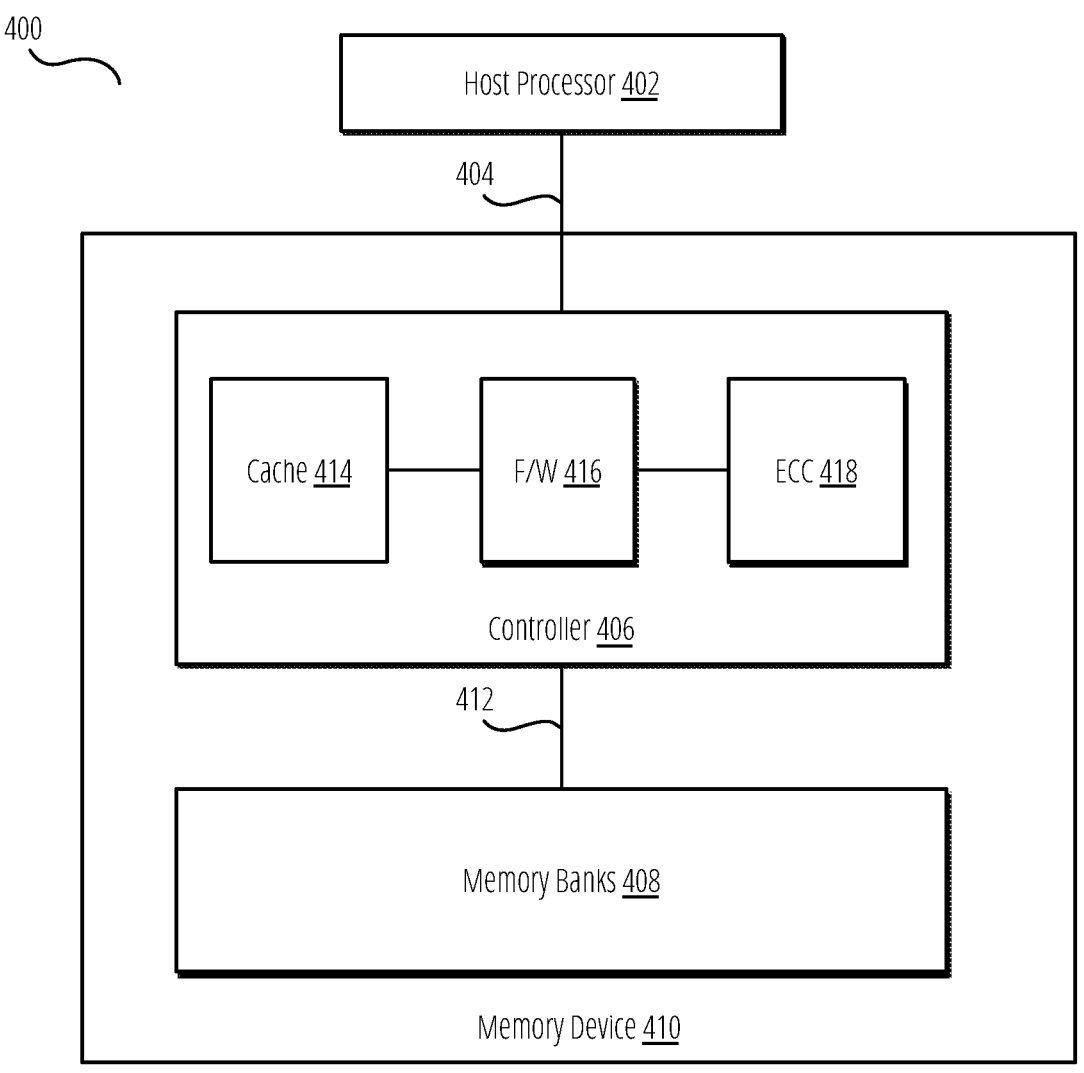
FIG. 4 is a block diagram illustrating a memory system according to some embodiments of the disclosure.

In an embodiment, the memory device 102 includes a key generator 108, key storage 106, signature generator 110, and a storage area 112. In an embodiment, the storage area 112 can comprise a readable and writable storage area (e.g., NAND Flash array). In some embodiments, the storage area 112 can include a plurality of memory banks as illustrated in FIG. 4.

In the illustrated embodiment, a key generator 108 is configured to generate a cryptographic key. In some embodiments, the cryptographic key can comprise symmetric key. In other embodiments, described more fully herein, the cryptographic key can comprise an asymmetric key pair comprising a public key and a private key.

In an embodiment, the key generator 108 can include a PUF. In an embodiment, the PUF may comprise a physical hardware circuit that exploits inherent randomness introduced during manufacturing to give a physical entity a unique 'fingerprint' or trust anchor. In the illustrated embodiment, the PUF produces a consistent and repeatable value. In some embodiments, the PUF may comprise a static random-access memory (SRAM) PUF, Delay PUF, or any other technology. In this embodiment, the PUF can be used to seed a well-known key generation algorithm to generate the cryptographic key. For example, the PUF value can be used to generate a private key in an Elliptic Curve Cryptography (ECC) cryptosystem. For example, the PUF value can be used as the point below an agreed-upon ECC curve. As another example, a random point below the agreed-upon ECC curve can concatenated with the PUF value and hashed to obtain the private key. From the private key, a public ECC key can be derived by multiplying the private key by a generator point.

In another embodiment, the key generator 108 can comprise a DICE system. In an embodiment, firmware in the memory device 102 can generate a device key under DICE standards. In brief, a DICE root layer can measure the first firmware layer (Layer 0) and compute a compound device identifier (CDI) using the measurement and a universal device secret (UDS). The CDI can then be used by the Layer 0 code to generate an asymmetric key pair (e.g., an ECC. Rivest-Shamir-Adleman (RSA), or ECDSA key pair). Details of DICE operations are not provided in detail herein and any standard implementation of the DICE protocol can be used.

The key generator 108 can be configured to write keys to key storage 106. In an embodiment, the key storage 106 can comprise a secure location for storing cryptographic keys. In some embodiments, the key storage 106 can comprise a write-protected region of the storage area 112. In other embodiments, the key storage 106 can comprise a secure storage location in a trusted platform module (TPM), hardware security module (HSM), or similar device. In some embodiments, key generator 108, key storage 106, and signature generator 110 may all be implemented in a TPM, HSM, or similar device.

The memory device 102 further includes a signature generator 110 that receives data from computing device 104 (as will be discussed). In an embodiment, the signature generator 110 is configured to load a private key from key storage 106 and generate a signature for the received data. In some embodiments, signature generator 110 may further be configured to execute a function transmitted from computing device 104 and generate a signature using the result of the function execution. In some embodiments, the signature generator 110 can performed an ECDSA signature operation using the private key stored in key storage 106 on a received value or a result of a calculation. In some embodiments, the signature generator 110 hashes the nonce or result and uses the hash as the data to sign. Other signature algorithms may be used. As illustrated, signature generator 110 can return the signature (and, optionally, the received data used to generate the signature) to the computing device 104 via validator 114.

In an embodiment, computing device 104 can comprise any computing device capable of communicatively coupling to the memory device 102. For example, the computing device 104 can comprise a system-on-a-chip, application-specific integrated circuit, or similar type of device. In an embodiment, a processor 120 in computing device 104 can execute firmware and software. In some embodiments, the firmware and software can be executed in a layered manner in that a first layer is executed before handing control to a subsequent layer. In some embodiments, the firmware and software can be configured to periodically communicate with nonce generator 118 and validator 114 to halt or continue execution of the processor 120 and thus firmware and software.

In an embodiment, at various points during the execution of firmware and software, the processor 120 may issue a request for a license to a license module 122. In an embodiment, the license module 122 can receive requests and return a result to processor 120. Based on the result from license module 122, the processor 120 can either continue processing or may halt execution of firmware or software.

In an embodiment, the license module 122 responds to a message by generating a nonce via nonce generator 118. In an embodiment, the nonce generator 118 can generate a nonce by generating a random or pseudo-random value (e.g., number). In some embodiments, the nonce generator 118 can comprise a monotonic counter that increments a counter each time a message is received. In yet another embodiment, the nonce generator 118 can generate a function as a nonce. For example, the function can comprise an executable instruction that generates a result. One example of a function is a mathematical expression. In this example, the function can be of the form a+b and the nonce generator 118 can generate random or pseudo-random values for a and b. The result is the result of adding a and b in this example. Other types of functions (e.g., multiplication, division, complex formulae) can be used, provided they return a deterministic result.

As illustrated, the nonce generator 118 transmits the generated nonce to signature generator 110 which returns a digital signature. Details of how the signature generator 110 generates a digital signature were provided previously and are not repeated. In an embodiment, a validator 114 receives the digital signature from signature generator 110. In an embodiment, the validator 114 loads a public key from key storage 116 and validates the digital signature. In an embodiment, the validator 114 can hash the nonce received from nonce generator 118 and decrypt the signature. Next, the validator 114 can compare the decrypted signature with the hashed nonce to confirm they are equal, and thus verify the signature. Other digital signature algorithms (e.g., ECDSA) can be used. When the signature is valid, the validator 114 can return a success message to the processor 120. In response to a success message, the processor 120 can continue execution normally.

By contrast, if the signature is not valid (or no signature is returned), this indicates that the expected memory device was not communicatively coupled to the computing device 104. In some embodiments, key storage 116 stores a public key associated with the rights to continue execution. For example, a user may license a piece of software and provide their public key to the vendor of the software. In response, the licensed piece of software may be updated to include the public key in the binary. The updated piece of software may then be installed on the computing device 104. As part of this process, the public key may be written to key storage 116. In some embodiments, the key storage 116 may comprise any storage location is only public keys are stored. When the memory device 102 attempts to load the piece of software, the computing device 104 will communicate with the memory device 102 in the manner described above to confirm that the memory device 102 contains the public key corresponding to the expected private key. In some embodiments, a digital certificate can be stored in key storage 116, the digital certificate including the expected public key. In some embodiments, this digital certificate can be generated by a manufacturer of the memory device 102 (e.g., when the keys of the memory device are created in a secure environment). In this manner, if the user were to lose computing device 104, a malicious user could not access the software. This is because when the validator 114 determines a signature mismatch (or missing signature), the validator 114 will return a failure to the processor 120 which will cause processor 120 to halt operations. In some embodiments, halting operations can comprise shutting down the computing device 104. In other embodiments, halting operations can comprise preventing the execution of a piece of software.

In the foregoing embodiments, firmware or software can be controlled via a licensing mechanism that does not require remote access during execution. That is, the memory device 102 can be used as a licensing extension of the computing device 104, such that computing device 104 will allow or disallow access to software only when a memory device 102 having the expected private key is communicatively couple to the computing device 104.

Figure 2:
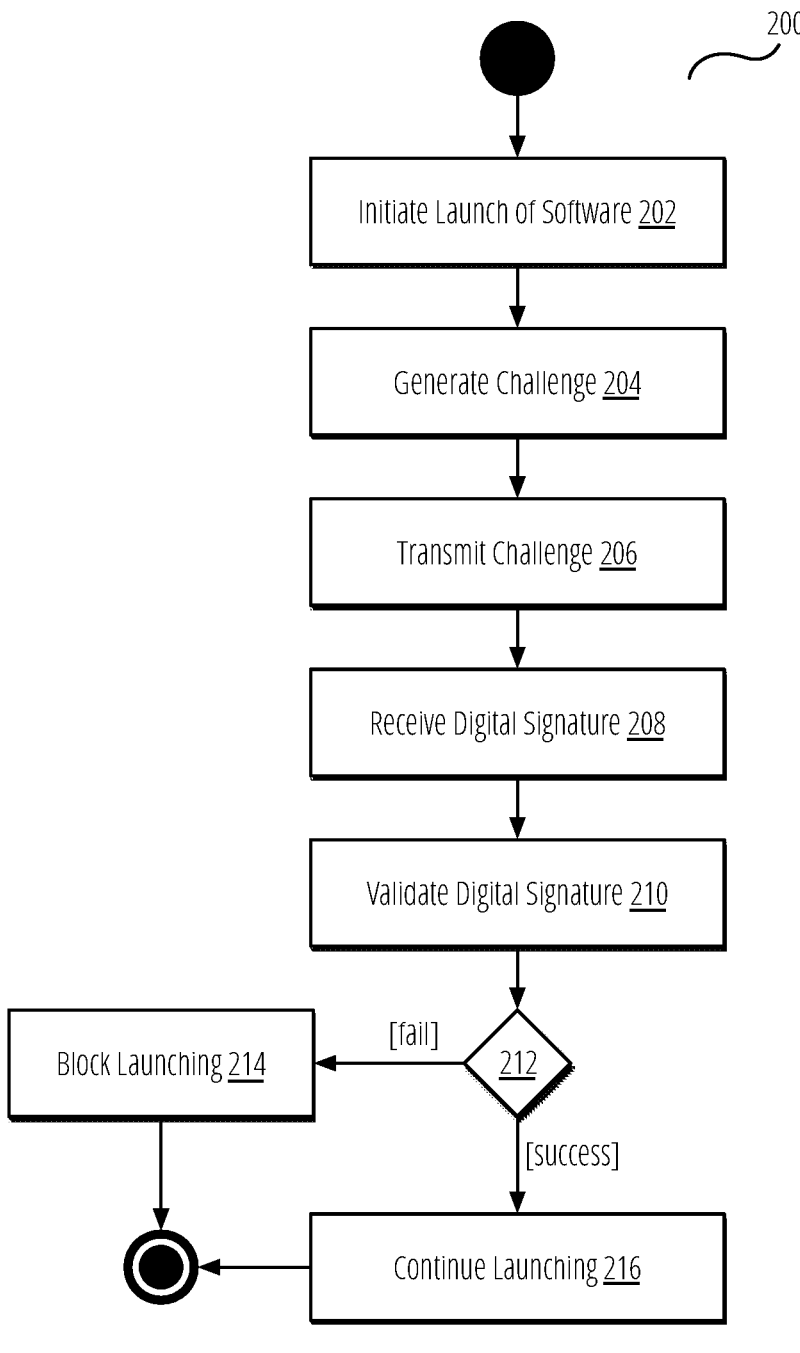
FIG. 2 is a flow diagram illustrating a method for verifying a license according to some of the example embodiments.

FIG. 2 is a flow diagram illustrating a method for verifying a license according to some of the example embodiments.

In step 202, method 200 can include initiating the launch of software or firmware. While the disclosure uses the term software, the embodiments may also be applied to firmware or other executable code. In some embodiments, method 200 begins by initiating the launch of software. In some embodiments, the software can comprise a layer of software in a DICE architecture. However, in other embodiments, any type of software may be initiated. For example, the software can comprise a desktop application or mobile application and the disclosure is not limited to as such. In some embodiments, the software can issue messages to a license module (e.g., license module 122) to proceed to step 204. That is, in some embodiments, the software can be configured to check for a license using the following steps. Thus, in some embodiments, step 202 also includes pausing execution of the software until a license is verified.

In step 204, method 200 can include generating a challenge. In some embodiments, step 204 can include generating a nonce value. In an embodiment, method 200 can generate a nonce by generating a random or pseudo-random value (e.g., number). In some embodiments, method 200 can comprise generating a challenge using a monotonic counter that increments a counter each time a message is received. In yet another embodiment, method 200 can generate a function as a nonce. For example, the function can comprise an executable instruction that generates a result. One example of a function is a mathematical expression. In this example, the function can be of the form a+b and method 200 can generate random or pseudo-random values for a and b. The result is the result of adding a and b in this example. Other types of functions (e.g., multiplication, division, complex formulae) can be used, provided they return a deterministic result.

In step 206, method 200 can include transmitting the challenge to a memory device. In some embodiments, method 200 can include transmitting the challenge over an interface to the memory device such as a Non-Volatile Memory Express (NVMe), Peripheral Component Interconnect Express (PCIe), etc. interface. In some embodiments, the memory device can support a custom command to issue challenges. In other embodiments, the challenge can be embedded in an existing command. Details of the operations undertaken by the memory device in response to the challenge are provided in the description of FIG. 3.

In step 208, method 200 can include receiving a digital signature from the memory device. In an embodiment, the digital signature can comprise a signature generated based on the challenge transmitted in step 206. In some embodiments, the digital signature can comprise an ECDSA signature, although the specific algorithm used is not limiting. In some embodiments, the digital signature can be generated using a private key stored by the memory device. In some embodiments, the private key of the memory device corresponds to a public key stored by method 200 (as will be discussed).

In step 210, method 200 can include validating the digital signature.

In an embodiment, method 200 loads a public key and validates the digital signature. In an embodiment, method 200 can hash the challenge (or a computed result of the challenge) sent to the memory device and decrypt the signature received from the memory device. In step 212, method 200 can include determining if the validation was successful. In some embodiments, method 200 can compare the decrypted signature with the hashed challenge (or a computed result of the challenge) to confirm they are equal, and thus verify the signature. Other digital signature algorithms (e.g., ECDSA) can be used. If the validation was successful, method 200 proceeds to step 216; otherwise, method 200 proceeds to step 214.

In step 216, method 200 can include continuing to launch the software. When the signature is valid, method 200 can return a success message to the software indicating that the correct private key was stored by the memory device and thus the owner of the public key is confirmed. In response to a success message, method 200 can continue to launch the software, thus providing licensed access to the software.

In step 214, method 200 can include blocking further launching of the software. If the signature is not valid (or no signature is returned), this indicates that the expected memory device was not communicatively coupled to the computing device that executes method 200. In some embodiments, method 200 loads a public key associated with the rights to continue execution. For example, a user may license a piece of software and provide their public key to the vendor of the software. In response, the licensed piece of software may be updated to include the public key in the binary. The updated piece of software may then be launched in step 202. As part of this process, the public key may be written to a key storage device. In some embodiments, a digital certificate can be stored in the key storage, the digital certificate including the expected public key. In this manner, if the user were to lose computing device that executes method 200, a malicious user could not access the software. This is because when method 200 determines a signature mismatch (or missing signature), method 200 will return a failure which will cause the processor to halt operations. In some embodiments, halting operations can comprise shutting down the computing device. In other embodiments, halting operations can comprise preventing the execution of a piece of software, as indicated in FIG. 2.

Figure 3:
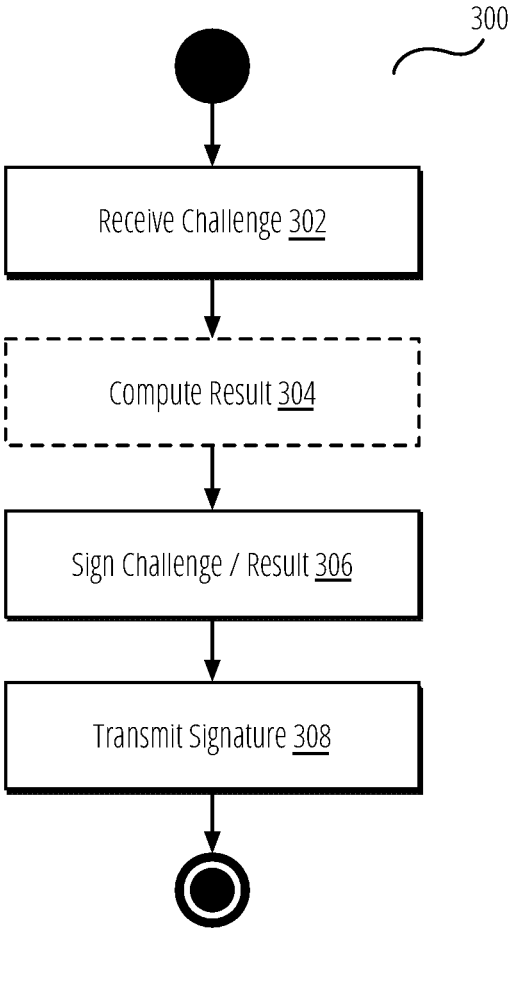
FIG. 3 is a flow diagram illustrating a method for generating a license signature according to some of the example embodiments.

FIG. 3 is a flow diagram illustrating a method for generating a license signature according to some of the example embodiments.

In step 302, method 300 can include receiving a challenge from a computing device. As described more fully in the foregoing description, the computing device can generate a challenge such as a nonce value, monotonic counter, or function and transmit this challenge to method 300 over an interface such as an NVMe or PCIe interface. In some embodiments, a dedicated command on the memory device is used to receive the challenge, while in other embodiments, existing commands can be overloaded.

In step 304, method 300 can optionally include computing a result from the challenge. In some embodiments, if the challenge comprises a function (e.g., a mathematical equation), method 300 can optionally execute the function to obtain a result. For example, the function can comprise an executable instruction that generates a result. One example of a function is a mathematical expression. In this example, the function can be of the form a+b and method 300 can generate random or pseudo-random values for a and b. The result is the result of adding a and b in this example. Other types of functions (e.g., multiplication, division, complex formulae) can be used, provided they return a deterministic result.

In step 306, method 300 can include signing a challenge or result of a challenge. In some embodiments, method 300 can read a private key from a secure storage area (e.g., write-protected region, HSM, TPM, etc.). In some embodiments, this private key comprises part of a key pair along with a public key that is known to the computing device. In some embodiments, method 300 can include hashing the challenge (or the result of executing the challenge functions) and encrypting the hash using the private key. Other types of signature algorithms (e.g., ECDSA) can be used.

In step 308, method 300 can include transmitting the signature generated in step 306 to the computing device. In some embodiments, method 300 can return a response to the command received in step 302 that includes the digital signature generated in step 306. In some embodiments, method 300 can alternatively return an error if the private key is not found, corrupt, or otherwise not able to be used to generate a digital signature.

FIG. 4 is a block diagram illustrating a memory system according to some embodiments of the disclosure.

As illustrated, a computing system 400 includes a host processor 402 communicatively coupled to a memory device 410 via a bus 404. The memory device 410 comprises a controller 406 communicatively coupled to memory banks 408, forming a memory array via an interface 412. As illustrated, the controller 406 includes a local cache 414, firmware 416, and an ECC module 418.

In the illustrated embodiment, host processor 402 can comprise any type of computer processor, such as a central processing unit (CPU), graphics processing unit (GPU), or other types of general-purpose or special-purpose computing devices. The host processor 402 includes one or more output ports that allow for the transmission of address, user, and control data between the host processor 402 and the memory device 410. In the illustrated embodiment, this communication is performed over the bus 404. In one embodiment, the bus 404 comprises an input/output (I/O) bus or a similar type of bus.

The memory device 410 is responsible for managing memory banks 408. In one embodiment, the memory banks 408 comprise NAND Flash dies or other configurations of non-volatile memory. In one embodiment, the memory banks 408 comprise a memory array.

The memory banks 408 are managed by the controller 406. In some embodiments, the controller 406 comprises a computing device configured to mediate access to and from memory banks 408. In one embodiment, the controller 406 comprises an ASIC or other circuitry installed on a printed circuit board housing the memory banks 408. In some embodiments, the controller 406 may be physically separate from the memory banks 408. The controller 406 communicates with the memory banks 408 over the interface 412. In some embodiments, this interface 412 comprises a physically wired (e.g., traced) interface. In other embodiments, the interface 412 comprises a standard bus for communicating with memory banks 408.

The controller 406 comprises various modules including local cache 414, firmware 416 and ECC module 418. In one embodiment, the various modules (e.g., local cache 414, firmware 416 and ECC module 418) comprise various physically distinct modules or circuits. In other embodiments, the modules (e.g., local cache 414, firmware 416 and ECC module 418) may completely (or partially) be implemented in software or firmware.

As illustrated, firmware 416 comprises the core of the controller and manages all operations of the controller 406. The firmware 416 may implement some or all of the methods described above. Specifically, the firmware 416 may implement the methods described in the foregoing figures.

Figure 5:
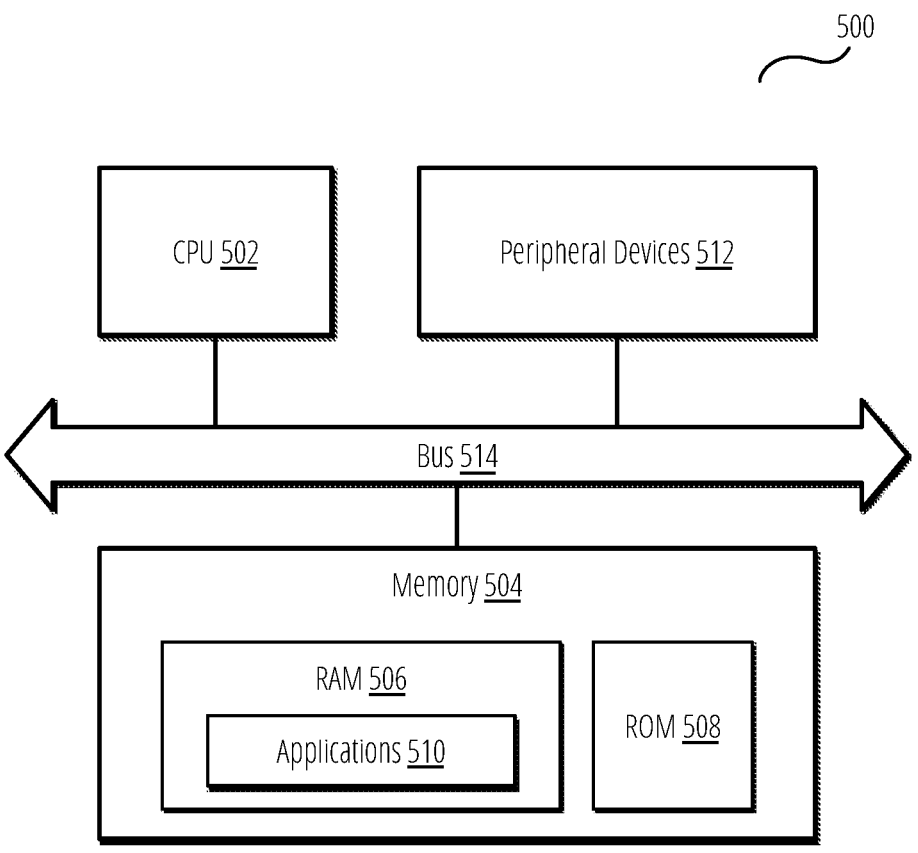
FIG. 5 is a block diagram of a computing device 500 according to some embodiments of the disclosure.

FIG. 5 is a block diagram of a computing device 500 according to some embodiments of the disclosure.

As illustrated, the device includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a non-transitory memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, bus 514 may comprise multiple busses instead of a single bus.

Memory 504 illustrates an example of non-transitory computer storage media for the storage of information such as computer-readable instructions, data structures, program modules, or other data. Memory 504 can store a basic input/output system (BIOS) in read-only memory (ROM), such as ROM 508, for controlling the low-level operation of the device. The memory can also store an operating system in random-access memory (RAM) for controlling the operation of the device Applications 510 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth™, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A system comprising:
a memory device comprising a secure storage region, the secure storage region storing a first cryptographic key, wherein the memory device further comprises a physically unclonable function (PUF), and the memory device is configured to generate the first cryptographic key using the PUF; and
a computing device, the computing device communicatively coupled to the memory device and configured to:
initiate execution of a software application;
generate a challenge value, wherein the challenge value comprises one of a nonce value or a function;
transmit a challenge value to the memory device;
receive a digital signature from the memory device, wherein the digital signature is generated by the memory device using the first cryptographic key and the challenge value;
validate the digital signature using a second cryptographic key associated with the software application;
continue the execution of the software application after validating the digital signature; and
halt processing upon determining that the digital signature is invalid.

2. The system of claim 1, wherein the first cryptographic key comprises a private key of an asymmetric key pair and the second cryptographic key comprises a public key of the asymmetric key pair.

3. The system of claim 2, wherein the asymmetric key pair comprises one of an Elliptic Curve Digital Signature Algorithm or Elliptic-curve Diffie-Hellman key pair.

4. The system of claim 2, wherein the memory device further comprises a Device Identity Composition Engine (DICE), and the memory device is configured to generate the asymmetric key pair using the DICE.

5. The system of claim 1, wherein the computing device is further configured to halt processing upon determining that the digital signature is invalid.

6. The system of claim 1, wherein the computing device receives the second cryptographic key embedded in or included with software to execute on the computing device.

7. The system of claim 1, wherein the challenge value comprises one of a nonce value or function.

8. The system of claim 1, wherein the memory device is further configured to sign the challenge value using the first cryptographic key.

9. A method comprising:
initiating, by a computing device, execution of a software application;
generating a challenge value, wherein the challenge value comprises one of a nonce value or a function;
transmitting, by the computing device, a challenge value to a memory device, the memory device storing a private key, wherein the memory device further comprises a physically unclonable function (PUF) configured to generate the private key;
receiving, by the computing device, a digital signature from the memory device, wherein the digital signature is computed by the memory device using the private key and the challenge value;
validating, by the computing device, the digital signature using a public key associated with the software application and corresponding to the private key;
continuing, by the computing device, the execution of the software application after validating the digital signature; and
halting processing upon determining that the digital signature is invalid.

10. The method of claim 9, further comprising halting processing upon determining that the digital signature is invalid.

11. The method of claim 9, further comprising receiving the public key embedded in or included with the software application.

12. The method of claim 9, wherein generating the challenge value comprises generating a nonce value.

13. The method of claim 9, wherein generating the challenge value comprises generating a function.

14. The method of claim 9, further comprising reading the public key from a digital certificate issued by a manufacturer of the memory device.

15. A non-transitory computer-readable storage medium for tangibly storing computer program instructions capable of being executed by a computer processor, the computer program instructions defining steps of:
initiating, by a computer processor, execution of a software application;
generating a challenge value, wherein the challenge value comprises one of a nonce value or a function;
transmitting, by the computer processor, a challenge value to a memory device, the memory device storing a private key, wherein the memory device further comprises a physically unclonable function (PUF) configured to generate the private key;

receiving, by the computer processor, a digital signature from the memory device, wherein the digital signature is computed by the memory device using the private key and the challenge value;

validating, by the computer processor, the digital signature using a public key associated with the software application and corresponding to the private key;

continuing, by the computer processor, the execution of the software application after validating the digital signature; and halting processing upon determining that the digital signature is invalid.

16. The non-transitory computer-readable storage medium of claim 15, the steps further comprising halting processing upon determining that the digital signature is invalid.

17. The non-transitory computer-readable storage medium of claim 15, the steps further comprising receiving the public key embedded in or included with the software application.

18. The non-transitory computer-readable storage medium of claim 15, wherein generating the challenge value comprises generating one of a nonce value and a function.

19. The non-transitory computer-readable storage medium of claim 15, the steps further comprising reading the public key from a digital certificate issued by a manufacturer of the memory device.

\* \* \* \* \*